(12) United States Patent
Di Meco et al.

(10) Patent No.: US 9,927,001 B2
(45) Date of Patent: Mar. 27, 2018

(54) USE OF A TRANSMISSION BELT IN OIL AND RELATED TRANSMISSION SYSTEM

(71) Applicant: DAYCO EUROPE S.R.L., Chieti (IT)

(72) Inventors: Marco Di Meco, Pescara (IT); Carlo Baldovino, Pescara (IT); Marino Petaccia, Lettomanoppello (IT)

(73) Assignee: Dayco Europe S.R.L, Chieti (IT)

( * ) Notice: Subject to any disclaimer, the term of this patent is extended or adjusted under 35 U.S.C. 154(b) by 719 days.

(21) Appl. No.: 14/375,442

(22) PCT Filed: Jan. 31, 2013

(86) PCT No.: PCT/IB2013/050837
§ 371 (c)(1),
(2) Date: Jul. 30, 2014

(87) PCT Pub. No.: WO2013/114318
PCT Pub. Date: Aug. 8, 2013

(65) Prior Publication Data
US 2015/0005123 A1    Jan. 1, 2015

(30) Foreign Application Priority Data

Jan. 31, 2012  (IT) .............................. TO2012A0080

(51) Int. Cl.
*F16G 1/10*    (2006.01)
*F16H 57/04*   (2010.01)
(Continued)

(52) U.S. Cl.
CPC ................ *F16G 1/10* (2013.01); *F16G 1/28* (2013.01); *F16G 9/04* (2013.01); *F16H 57/0489* (2013.01)

(58) Field of Classification Search
CPC ........... F16G 1/10; F16G 9/04; F16H 57/0489
See application file for complete search history.

(56) References Cited

U.S. PATENT DOCUMENTS 4,126,053 A * 11/1978 Cicognani ................. F16G 5/08
474/263
4,734,085 A * 3/1988 Takashima .............. F16G 5/166
474/201

(Continued)

FOREIGN PATENT DOCUMENTS

| CN | 1294048 | 5/2001 |
| CN | 1641245 | 7/2005 |

(Continued)

OTHER PUBLICATIONS

CN, Office Action; Chinese Patent Application No. 201380012080.6 (dated Jul. 3, 2015).

(Continued)

*Primary Examiner* — William E Dondero
*Assistant Examiner* — Mark K Buse
(74) *Attorney, Agent, or Firm* — FisherBroyles, LLP; Suan M. Oiler

(57) ABSTRACT

A fabric for transmission belts is described that is made entirely with polyaramid fibers. Furthermore, a transmission belt is provided that comprises a body made of a first elastomeric material, in which a plurality of resistant longitudinal filiform inserts is embedded, and a working surface covered in a covering fabric comprising polyaramid fibers in weft and warp yarns; advantageously, the transmission belt is a toothed belt. According to the present invention, in use, the belt is in continuous contact with oil or partially immersed in oil.

17 Claims, 6 Drawing Sheets

(51) Int. Cl.
*F16G 9/04* (2006.01)
*F16G 1/28* (2006.01)

(56) References Cited

U.S. PATENT DOCUMENTS

| | | | |
|---|---|---|---|
| 4,790,802 A * | 12/1988 | Onoe | F16G 1/08 474/260 |
| 5,120,280 A | 6/1992 | Mizuno et al. | |
| 5,417,618 A | 5/1995 | Osaka et al. | |
| 6,470,944 B1 | 10/2002 | Billings et al. | |
| 6,685,785 B1 | 2/2004 | Morris et al. | |
| 7,781,528 B2 * | 8/2010 | Takehara | C08L 23/16 474/252 |
| 7,824,284 B2 * | 11/2010 | Burlett | B29D 29/08 428/167 |
| 8,475,309 B2 | 7/2013 | Di Meco et al. | |
| 8,568,260 B2 * | 10/2013 | Baldovino | F16G 1/28 474/205 |
| 2005/0096433 A1 | 5/2005 | Takehara et al. | |
| 2011/0118068 A1 * | 5/2011 | Mitsutomi | F16G 1/28 474/205 |
| 2012/0157251 A1 * | 6/2012 | Di Meco | F16G 1/28 474/91 |
| 2012/0192822 A1 * | 8/2012 | Rolando | F16G 1/28 123/90.31 |
| 2013/0217528 A1 * | 8/2013 | Matsumoto | F16G 1/10 474/263 |
| 2014/0087904 A1 * | 3/2014 | Avery | D03D 1/0094 474/267 |

FOREIGN PATENT DOCUMENTS

| | | |
|---|---|---|
| CN | 101384834 | 3/2009 |
| CN | 201301926 | 9/2009 |
| EP | 0466476 | 1/1992 |
| EP | 1087056 | 3/2001 |
| WO | 00/19123 | 4/2000 |
| WO | 2005/080820 | 9/2005 |
| WO | 2010/116390 | 10/2010 |
| WO | WO2010/116390 * | 10/2010 |
| WO | 2011/015945 | 2/2011 |

OTHER PUBLICATIONS

PCT, International Search Report and Written Opinion, PCT/IB2013/050837 (dated Jun. 13, 2013).
CN, Third Office Action, Chinese Patent Application No. 201380012080.6 (dated Sep. 15, 2016).
Zande, Steve, "What are the differences between Meta-Aramid and Para-Aramid yarns?"; Service Thread; available at http://www.servicethread.com/blog/what-are-the-differences-between-meta-aramid-and-para-aramid-yarns; 6 pages (Nov. 20, 2015).

* cited by examiner

SWELLING TEST

USE OF A TRANSMISSION BELT IN OIL AND RELATED TRANSMISSION SYSTEM

TECHNICAL FIELD

The present invention relates to a transmission belt comprising a fabric and a related transmission system; in particular, the invention relates to a toothed belt.

STATE OF THE PRIOR ART

Toothed belts normally comprise a body made of an elastomeric material, in which a plurality of resistant longitudinal filiform inserts, also known as cords, and a plurality of teeth covered by a covering fabric are embedded.

Each component of the belt contributes to increasing performance in terms of mechanical resistance, so as to decrease the risk of the belt breaking and to increase the specific transmissible power.

The cords contribute particularly to ensuring the necessary mechanical characteristics of the belt and essentially contribute to the modulus of the belt itself and, in particular, ensure long-term performance duration. The cords are normally obtained by twisting high-modulus fibres several times.

The cords are normally treated with suitable compounds to increase the compatibility of the fibres with the body mixture that surrounds the cords.

The body mixture enables connecting the above-stated elements and ensuring that they contribute synergistically to the final performance of the belt.

The body mixtures are based on one or more elastomeric materials, preferably enriched with fibres to increase hardness.

Finally, the covering fabric of the belts has the task of increasing the abrasion resistance and therefore protect the working surface of the belt from wear due to friction between the sides and the faces of the belt's teeth and the groove sides and bottoms of the pulley with which the belt interacts.

Furthermore, the covering fabric decreases the friction coefficient on the working surface, reduces the deformability of the teeth and, above all, strengthens the base of the teeth, in this way preventing broken teeth.

The use of covering fabrics is currently known, in particular for toothed belts, for example, with a simple structure constituted by a weft and warp with weft yarns comprising polyamide fibres or with a composite structure, in which the weft is constituted by weft yarns, each formed by an elastic yarn as a core and a pair of composite yarns wound around elastic yarn, each composite yarn comprising a yarn of high thermal and mechanical resistance and at least one covering yarn wound around the yarn of high thermal and mechanical resistance. Each composite yarn comprises a yarn of high thermal and mechanical resistance and a pair of covering yarns wound around the yarn of high thermal and mechanical resistance. The elastic yarn could, for example, be made of polyurethane. The yarn of high thermal and mechanical resistance could, for example, be made of para-aromatic polyamide.

However, this solution is particularly disadvantageous as the manufacture of these covering fabrics requires very complex and expensive technologies due to the composite structure with which they are made.

Alternative materials are therefore sought for the production of a covering fabric for transmission belts, in particular toothed belts, which enable a simpler and thus less expensive fabric configuration to be obtained, which adheres to the surface of the teeth perfectly, and which still allow maintaining mechanical characteristics comparable to or better than those of known fabrics.

In addition, in the last few years, more stringent emission regulations have resulted in designing engines that reach increasingly higher temperatures in the engine compartment when running.

The materials currently used for making covering fabrics, for example, comprising simple nylon 66 yarns in the longitudinal direction of the belt, do not exhibit optimal behaviour at these high temperatures.

In up-to-date engines where performance has been significantly increased, toothed belts are subjected to high temperatures and these temperatures lead to quicker deterioration of the materials constituting the various components of the belts.

Furthermore, belts are often used in oil, or rather in systems in which the belt is inside the crankcase and is therefore in direct contact with oil spray or even works permanently and partially immersed in oil. In particular, the materials of transmission belts used "dry", designed to resist oil only for brief periods and at low temperatures, do not allow averting a worsening of the mechanical characteristics at high temperatures and can therefore give rise to teeth breaking and consequently shorten the average life of the belt.

Covering fabrics are therefore sought that are resistant to the high temperatures of current-day engines, in particular when used continuously in oil.

Furthermore, both when used dry and when used in oil or inside the engine crankcase, belts are subjected to attack by numerous chemical agents. In systems where the belt is used in direct contact or partially immersed in oil, the engine oil often contains pollutants such as ethanol, petrol and diesel fuel. In particular, pollution from petrol that mixes with the oil, even in quite high percentages, diluting the oil and attacking the materials constituting the belt, is harmful for the materials of the fabric.

For example, in some applications, the oil can contain up to 30% petrol. The percentage of petrol is variable, depending on the running conditions of the engine, and increases with high load and low engine temperature.

In addition, the modern, so-called green fuels are particularly aggressive as they contain numerous additives that attack the yarns of the fabric.

Covering fabrics are therefore sought that are able to work for the entire lifespan of the belt in oil, but which, at the same time, are resistant to other chemical agents, especially at high temperatures.

SUMMARY OF THE INVENTION

A first object of the present invention is to obtain a covering fabric that is resistant to high temperatures, when dry and particularly in oil, and is easily and inexpensively manufactured.

A second object of the present invention is to obtain a covering fabric that is resistant to chemical agents, especially impurities present in engine oil.

A further object of the present invention is to obtain a transmission belt, in particular a toothed belt, which has a long life and therefore has excellent mechanical, adhesion and meshing precision characteristics.

A further object of the present invention is to obtain a transmission system that comprises a toothed belt in which the surface of the teeth is covered with a covering fabric that is simple and resistant to both temperature and chemical agents.

According to the present invention, these objects are achieved by a transmission belt for continuous contact with oil or immersion in an oil bath that has a body made of a first elastomeric material, a toothing, a plurality of resistant longgitudinal inserts embedded in the body of the belt, and a back. The belt has a working surface covered with a covering fabric having weft yarns that comprise polyaramid, and warp yarns that consist of poly-meta-aramid.

According to the present invention, a transmission system is also provided that includes a timimg control system for a motor vehicle that has at least one drive pulley, a driven pulley, and means adapted to continuously maintain the belts described herein in contact with oil or immersed in oil.

BRIEF DESCRIPTION OF DRAWINGS

For a better understanding of the present invention, it will now be described with reference to the attached figures, where.

DESCRIPTION OF INVENTION

Hereinafter, it is understood that "the elastomeric material is essentially constituted" means that the elastomeric material can comprise small percentages of other polymers or copolymers, which can be added to the elastomeric material without changing the chemical and physical characteristics of the mixture and therefore without leaving the scope of the present invention.

Hereinafter, it is understood that "additive for elastomeric material" means some kind of material that is added to the elastomeric material to change its chemical and physical characteristics.

It is understood that "in-oil" or "continuously in contact with oil or in an oil bath" means that, in use, the belt is partially immersed in oil or continuously in direct contact with oil. In general, in use, the belt is inside the engine crankcase, for example, as an alternative to chain or gear systems.

It is understood that "dry" use means that the belts are outside the engine crankcase and are only accidentally in contact with engine oil and not generally in contact with oil mixed with petrol.

It is understood that used "in oil mixed with petrol" means that the toothed belt is used in a mixture of oil with percentages of petrol even exceeding 30%.

It is understood that "textured" means that the fabric comprises a yarn thermally and mechanically treated so as to assume a permanent deformation of the individual filaments suitable for increasing extensibility and volume.

It is understood that "warp" within the scope of the present invention means the set of yarns that, in use, are in a latitudinal direction in the belt, i.e. they extend in a perpendicular direction with respect to the direction of motion of the belt in use.

It is understood that "weft" means the set of yarns that, in use, are in a longitudinal direction in the belt, i.e. they extend in a longitudinal direction with respect to the direction in which the belt moves.

In the case of toothed belts, the weft yarns must have elasticity such as to enable the fabric to deform in order to follow the profile of the teeth during the vulcanization step of the belt.

It is understood that "polyaramid" or "aromatic polyamide" means a polyamide obtained from at least one monomer containing an aromatic ring.

It is understood that "para-aramid" means a polyamide containing at least two aromatic rings side by side in the polymer chain, which are bonded in a para position (atoms 1 and 4).

Examples of such materials are Kevlar®, Technora®, Heracron® and Twaron®.

It is understood that "meta-aramid" means a polyamide containing at least two aromatic rings side by side in the polymer chain, which are bonded in a meta position (atoms 1 and 3).

Examples of such materials are Conex® and Nomex®.

Figure 1:
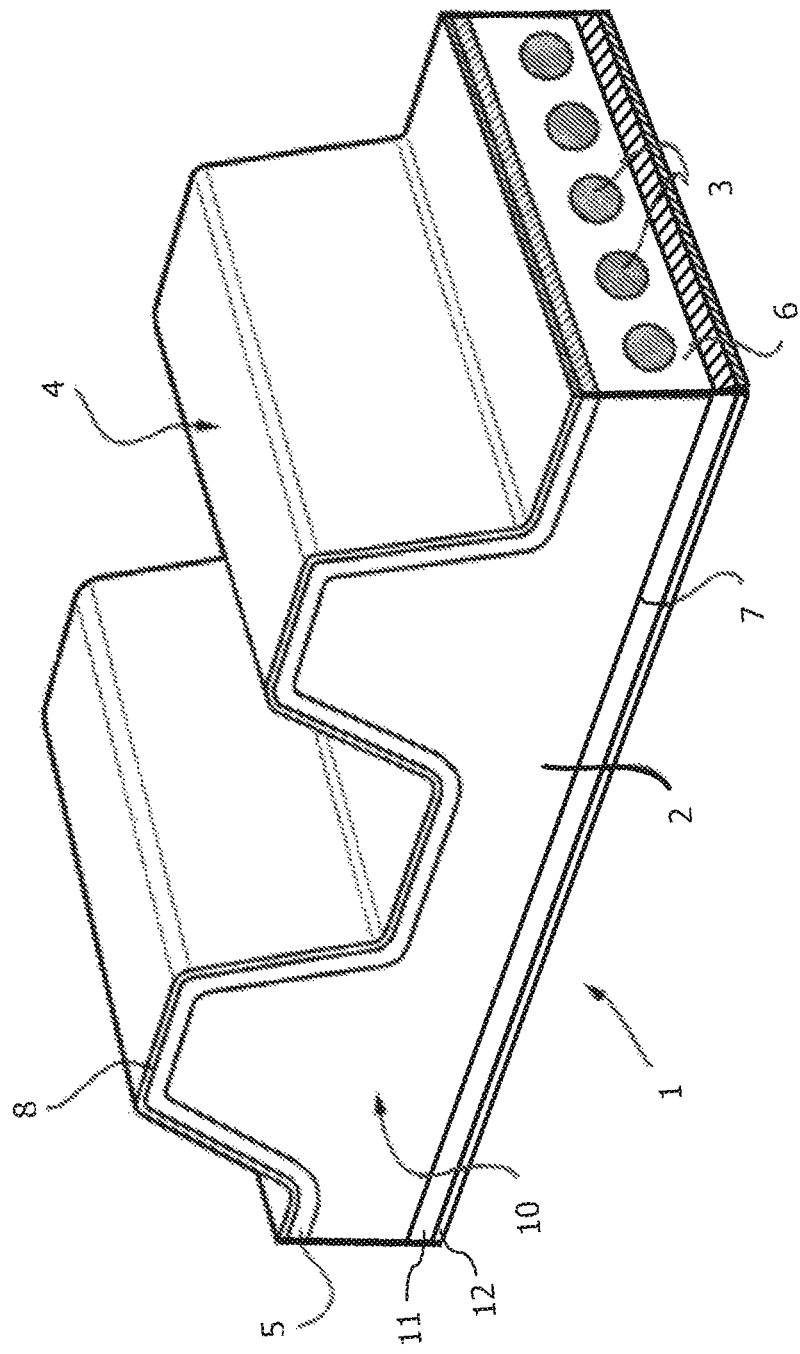
FIG. 1 shows a partial perspective view of a toothed belt according to the present invention.

In FIG. 1, a toothed belt is indicated as a whole by reference numeral 1. The belt 1 comprises a body 2 made of an elastomeric material, in which a plurality of resistant longitudinal filiform inserts are embedded.

The body 2 has a toothing 4, which is covered by a covering fabric 5. The covering fabric 5 can also be placed on the back 7 of the belt.

The covering fabric 5 of the toothing 4 or the covering fabric 11 of the back 7 can be constituted by one or more plies and can be obtained through different weaving techniques, for example, by using the weaving technique known as 2×2 twill.

The fabric 5 is generally subjected to a first, second, third and fourth treatment.

These treatments have been found extremely advantageous in order for the belt to have a long life in continuous contact with oil at high temperatures.

Advantageously, the first treatment is based on polyisocyanides.

The first treatment has been found to be particularly effective in making polyaramid fibres and therefore, in the case of the present invention, the entire fabric, adhere to the body elastomers.

Advantageously, the fabric 5 is subsequently subjected to a second treatment with Resorcinol Formaldehyde Latex (RFL), which increases the adhesive capacity of the fabric to the underlying body mixture. Clearly, RFL can be substituted by other adhesives that are useful for the same purpose.

Advantageously, the fabric 5 is subsequently subjected to a third treatment based on a rubber, also known as cement, preferably a hydrogenated nitrile rubber, for example a Zetpol. The purpose of this treatment is to further increase the compatibility between fabric and body mixture and for this reason preferably comprises materials of the same chemical type as the body mixture, such as those formed from a nitrile-group containing monomer, such as NBR, HNBR and XHNBR for example.

In addition, the belts of the present invention are preferably coated by means of a fourth treatment; even more preferably this treatment forms a coating that is, for example, calendered on top of the fabric.

The third and fourth treatments can be substituted, for example, by a single treatment that comprises elastomers and an anti-friction material such as PTFE or even graphite, molybdenum disulfide, copper powders and similar.

The fourth treatment advantageously comprises a fluorinated polymer, for example PTFE, and a processing elastomer, for example a material similar to that used for the body mixture or a fluoroelastomer.

Advantageously, one or more copolymers formed from a nitrile-group containing monomer and a diene can therefore be used as elastomers for the fourth treatment.

Advantageously, the monomers containing the nitrile-group are in a percentage in the range between 15 and 60% with respect to the entirety of end copolymers.

Advantageously, the monomers containing the nitrile-group are in a percentage in the range between 33 and 51% with respect to the entirety of end copolymers.

More advantageously, they are between 15 and 25% by weight for cold applications with temperatures down to −40° C., between 33 and 39% by weight for belts with dry applications and between 39 and 51% by weight for in-oil applications.

Even more advantageously, for in-oil applications they are between 49 and 51% by weight, for example 50% by weight, while for dry applications they are between 19 and 23% by weight, for example 21% by weight.

More advantageously, the processing copolymer(s) used are nitrile rubbers and/or fluoroelastomers, and even more advantageously, are acrylonitrile butadiene rubbers, known by the acronym NBR. Even more advantageously, they are hydrogenated acrylonitrile butadiene or HNBR, or even XHNBR, i.e. carboxylated hydrogenated acrylonitrile butadiene.

By opportunely choosing the quantities of the materials of which it is formed, the fourth treatment conveniently forms a covering coating distinct and separate from the fabric itself, hereinafter also called the wear-resistant coating 8. The wear-resistant coating 8 constitutes the working surface of the belt and therefore further increases wear resistance and decreases oil absorption.

Advantageously, the fluorinated polymer is present in the wear-resistant coating 8 in a larger phr quantity than the sum of the fluorinated elastomer and the second elastomeric material.

The gauge of the wear-resistant coating 8 is advantageously between 0.03 mm and 0.3 mm.

The wear-resistant coating 8 can be placed on top of the fabric 5 in different ways. Preferably, it is placed by means of a calendering step.

An adhesive material can be arranged between the fabric 5 and the wear-resistant coating 8 to improve adhesion of the wear-resistant coating 8 on the fabric 5.

Preferably, to ensure the necessary resistance, the wear-resistant coating 8 has a weight in the range between 200 and 400 gr/m$^2$.

Preferably, the back 7 of the belt is also covered by covering fabric 11, the same as previously described.

Preferably, the covering fabric 5 is also treated with different treatments. It has been found to be particularly advantageous to treat the back 7 with a treatment similar to the fourth treatment of the fabric, which covers the above-described working surface. More advantageously, this fourth treatment forms a wear-resistant coating on top of the fabric. Even more preferably, the wear-resistant coating 12 that covers the covering fabric 11 of the back 7 is the same as that which covers the covering fabric 5 of the teeth.

The covering fabric 5 has a structure constituted by a weft and warp, in which both the weft and the warp contain yarns comprising polyaramid fibres.

Advantageously, the weft yarns comprise at least one elastic yarn and at least one fibre yarn of polyaramid fibres to facilitate stretching the fabric so that it follows the profile of the teeth during the vulcanization step. Even more advantageously, the weft yarns comprise an elastic yarn and at least a first and a second fibre yarn of polyaramid fibres.

In a particularly preferred embodiment of the invention, a transmission belt 1 in which the working surface is covered by a fabric in which a first fibre yarn of polyaramid fibres is wound around an elastic yarn in a first direction S and a second fibre yarn of polyaramid fibres is wound in the opposite direction Z around the first yarn, has proved to be particularly resistant in oil.

Advantageously, the elastic yarn is made of polyurethane, which provides the elasticity of the fabric during formation of the tooth.

Advantageously, the weft yarns comprise para-polyaramid fibres.

For example, the weft yarns could be formed by winding a pair of para-polyaramid yarns, Technora yarns for example, around a polyurethane yarn.

The yarns can be textured in order to avoid using an elastic yarn as the core.

Advantageously, the warp yarns comprise meta-polyaramid fibres.

Figure 5:
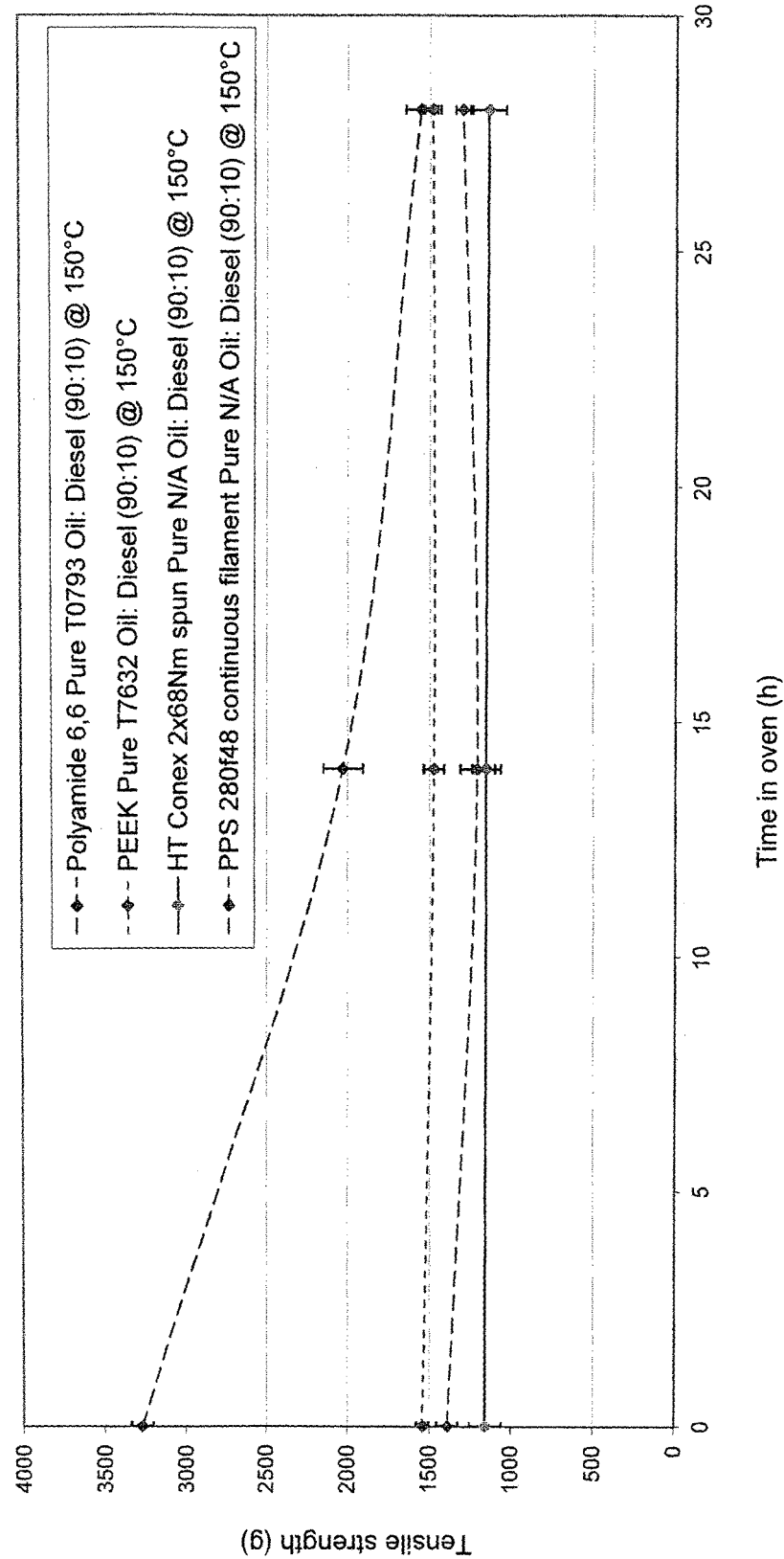
FIG. 5 is graph showing the values of tensile strength measured for yarns made of poly-meta-aramid and other materials maintained at 150° C. for 28 days in oil mixed with 10% petrol.

The use of meta-polyaramid yarns proves to be particularly advantageous as it has been surprisingly found that they are able to maintain excellent tension values even at high temperatures and in oil mixed with petrol, as shown by the results of the graph in FIG. 5, which shows the running conditions of toothed belts in oil, i.e. when the toothed belts are inside the engine crankcase in place of chain or gear systems and are continuously in direct contact with oil or even partially immersed in an oil bath.

Preferably, a value in the range between 300 and 800 dtex is used for the warp yarns of the present invention.

In particular, Conex yarns have proven to be particularly advantageous, even more preferably in the 40/2 configuration, i.e. 500 dtex.

Advantageously, fabrics are used that have weft yarns composed of an elastic yarn such as polyurethane around which two yarns of poly-para-aramid are wound. The tensile strength of the pretreatment fabric in the longitudinal direction of the belt is in the range between 800 and 1400 N/25 mm, even more advantageously, between 1000 and 1200 N/25 mm.

Advantageously, fabrics are used that have warp yarns composed of a poly-meta-aramid yarn. The tensile strength in the latitudinal direction is in the range between 700 and 1300 N/25 mm, even more advantageously, between 900 and 1100 N/25 mm.

Advantageously, fabrics are used that have a weight after the first two treatments in the range between 400 and 1000 grams/m$^2$. Even more advantageously, between 500 and 700 grams/m$^2$.

Advantageously, the body 2 is made of a body mixture, said body mixture also constituted by one or more elastomers.

Advantageously, the body mixture comprises one or more copolymers formed from a nitrile-group containing monomer and a diene.

Advantageously, the monomers containing the nitrile-group are in a similar percentage to those of the body material.

Advantageously, the monomers containing the nitrile-group are in a percentage in the range between 15 and 60% with respect to the entirety of end copolymers.

More advantageously, they are between 15 and 25% by weight for cold applications with temperatures down to −40° C., between 33 and 39% by weight for belts with dry applications and between 39 and 51% by weight for in-oil applications.

More advantageously, the copolymer(s) used as body mixtures are nitrile rubbers; advantageously, they are acrylonitrile butadiene rubbers, known by the acronym NBR. Even more advantageously, they are hydrogenated acrylonitrile butadiene or HNBR, or even XHNBR, i.e. carboxylated hydrogenated acrylonitrile butadiene.

Advantageously, the HNBR used for making transmission systems in which the belt is partially in an oil bath or in direct contact with oil and impurities has a high level of hydrogenation. For example, so-called fully saturated HNBRs can be used, these having a percentage of residual double bonds of 0.9% at most, but HNBRs with a lower level of saturation can also be used, such as HNBRs with a saturation level of 4% or 5.5%, known as partially saturated HNBRs.

Some examples of the HNBR copolymers that can be used in the body mixture, and also in the different treatments of the various elements that form the toothed belt, include copolymers belonging to the THERBAN family of products from Lanxess, such as THERBAN 3407 with 34% nitrile groups and a of hydrogenation level of 0.9% at most, THERBAN 3406 with 34% nitrile groups and an unsaturation level of 0.9% at most, THERBAN 3607 with 36% nitrile groups and an unsaturation level of 0.9% at most, THERBAN 3446 with 34% nitrile groups and an unsaturation level of 4% at most, THERBAN 3447 with 34% nitrile groups and an unsaturation level of 5.5% at most, THERBAN 3627 with 36% nitrile groups and an unsaturation level of 2% at most, THERBAN 3629 with 36% nitrile groups and an unsaturation level of 2% at most, and THERBAN 3907 with 39% nitrile groups and an unsaturation level of 0.9% at most.

Alternatively, it is also possible to use HNBRs produced by Nippon Zeon under the name ZETPOL. In particular, ZETPOL 2000 with 36% nitrile groups and an unsaturation level of 0.9% at most, ZETPOL 2000L with 36% nitrile groups and an unsaturation level of 0.9% at most, ZETPOL 2010 with 36% nitrile groups and an unsaturation level of 4% at most, ZETPOL 2010L with 36% nitrile groups and an unsaturation level of 4% at most, ZETPOL 2010H with 36% nitrile groups and an unsaturation level of 4% at most, ZETPOL 2020 with 36% nitrile groups and an unsaturation level of 5.5% at most, and ZETPOL 2020L with 36% nitrile groups and an unsaturation level of 5.5% at most.

Even more advantageously, a polymer is used that is formed from a mixture of one or more copolymers, obtained from a diene monomer and a nitrile-group containing monomer. One or more of these copolymers advantageously have an unsaturated carboxylic acid or a salt of an unsaturated carboxylic acid added to them.

More advantageously, the unsaturated carboxylic acid is an acrylic or methacrylic acid and said salt is a zinc salt of an acrylic or methacrylic acid.

Even more advantageously, a zinc salt of a methacrylic acid is used.

Even more advantageously, the zinc salt of the methacrylic acid is added in a quantity of between 10 and 60 phr.

For example, the elastomers sold by Zeon with the following names are advantageously used: ZSC 1295, ZSC 2095, ZSC 2195, ZSC 2295, ZSC 2295L, ZSC 2295R and ZSC 2395.

In particular, it is possible to partially or entirely substitute the previously mentioned HNBRs, namely ZETPOL and/or THERBAN with a ZSC that comprises an unsaturated carboxylic acid and zinc oxide and/or with THERBAN ART, which comprises an unsaturated carboxylic acid salt.

Alternatively, for making transmission systems in which the belt is dry, polymers based on NBR or HNBR with a percentage of acrylonitrile in the range between 15 and 25% are used.

The mixture of the first elastomeric material can also comprise conventional additives such as, for example, reinforcing agents, fillers, pigments, stearic acid, accelerators, vulcanization agents, antioxidants, activators, initiators, plasticizers, waxes, prevulcanization inhibitors, antidegradants, process oils and similar.

Advantageously, carbon black can be used as filler, which is advantageously added in quantities of between 0 and 80 phr, more advantageously, approximately 40 phr. Advantageously, reinforcing pale fillers such as talc, calcium carbonate, silica and silicates are added in quantities advantageously between 0 and 80 phr, advantageously approximately 40 phr. Silanes can also be advantageously used, in quantities between 0 and 5 phr.

Advantageously, zinc and magnesium oxides are added in quantity of between 0 and 15 phr.

Advantageously, ester plasticizers, such as trimellitates or ethyl esters are added in a quantity advantageously between 0 and 20 phr.

Advantageously, vulcanization coagents can be added, such as triallyl isocyanurates, and organic and inorganic methacrylates such as metal salts, in a quantity advantageously between 0 and 20 phr, or organic peroxides, such as isopropylbenzene peroxide for example, in a quantity advantageously between 0 and 15 phr.

Advantageously, it is possible to use resistant inserts 3, also known as cords, made of a material chosen from a group consisting of glass fibres, aramidic fibres, carbon fibres and PBO fibres; in addition, it is also possible to use cords of the so-called "hybrid" type, i.e. comprising threads of different materials, advantageously chosen from those previously mentioned.

Preferably, the fibres constituting the cord are treated with an HNBR latex vulcanized with water-soluble peroxides by means of the process described in patent WO2004057099, held by Nippon Glass.

A toothed belt 1 according to the present invention is made using known manufacturing processes.

Toothed belts comprising the fabric of the present invention have shown excellent resistance to chemical agents and therefore to aging, in particular in dry applications, but also in oil, oil/diesel and oil/biodiesel mixtures, petrol, E25 and all types of fuel used.

Advantageously, the use of polyaramid fibres in both weft and warp in a covering fabric for transmission belts enables using simple and less expensive technologies with respect to those used in the production of composite fabrics in the prior art.

The belts according to the present invention are particularly suited for being use in systems in direct contact with oil or partially immersed in oil. In particular, optimal results have been achieved in the case where the belt is used in place of traditional gear or chain systems inside the crankcase, systems in which the belt is exposed for its entire life to continuous contact with oil spray or, if necessary, is partially immersed in an oil bath.

In this case, when a covering fabric 5 is present on the back 7, the second, third and fourth treatments in particular, are also advantageously carried out on the back 7. In addition, the case where the fourth treatment forms a wear-resistant coating is particularly preferred.

In this case, the wear-resistant coating 8 enables preventing oil penetration from the back 7 of the toothed belt 1 as well, and is particularly advantageous when the toothed belt 1 is used in control systems in which the back 7 of the belt is in contact with shoes or tensioners. In fact, in these systems oil remains interposed between the contact surface of the shoe or tensioner with the belt and the back of the belt and therefore penetration inside the mixture that constitutes the body would be favoured.

Preferably, the toothed belt 1 can be treated on all the outside surfaces and, in particular, on the sides 10 where the body mixture is most exposed to attack by oil, with a swelling resistant rubber, for example ENDURLAST®.

Figure 2:
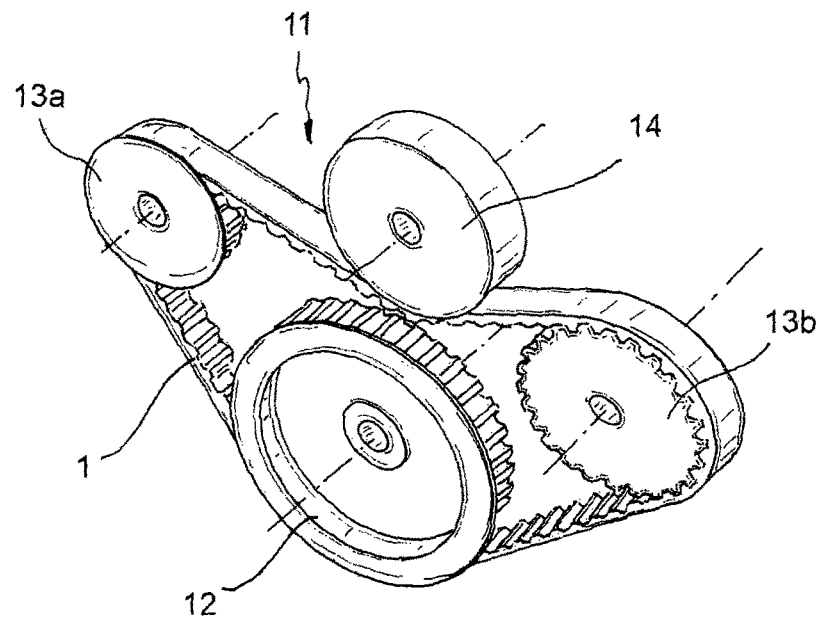
FIG. 2 is a diagram of a first timing control system using a first toothed belt according to the present invention.

The belt 1 according to the present invention can be advantageously used, for example, in a timing control system for a motor vehicle of the type shown in FIG. 2. In the figure, the timing control system is indicated as a whole by reference numeral 11 and comprises a drive pulley 12 rigidly fastened to the drive shaft, not shown, a first 13a and a second 13b driven pulley and a tensioner 14 for tensioning the toothed belt.

Figure 3:
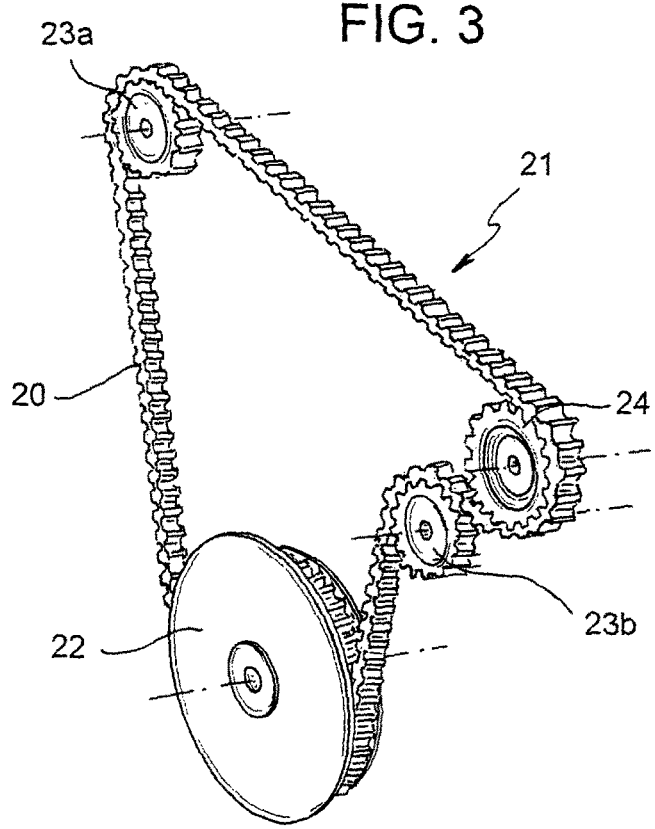
FIG. 3 is a diagram of a second timing control system using a second toothed belt according to the present invention.

According to a second alternative embodiment, shown in FIG. 3, a toothed belt according to the present invention is indicated by reference numeral 20, has a toothing on both faces and therefore has a resistant fabric that covers both toothings.

A toothed belt 20 can, for example, be used in a timing control system for a motor vehicle of the type shown FIG. 3. In the figure, the timing control system is indicated as a whole by reference numeral 21 and comprises a drive pulley 22 rigidly fastened to the drive shaft, not shown, a first 23a, a second 23b and a third 24 driven pulley.

Figure 4:
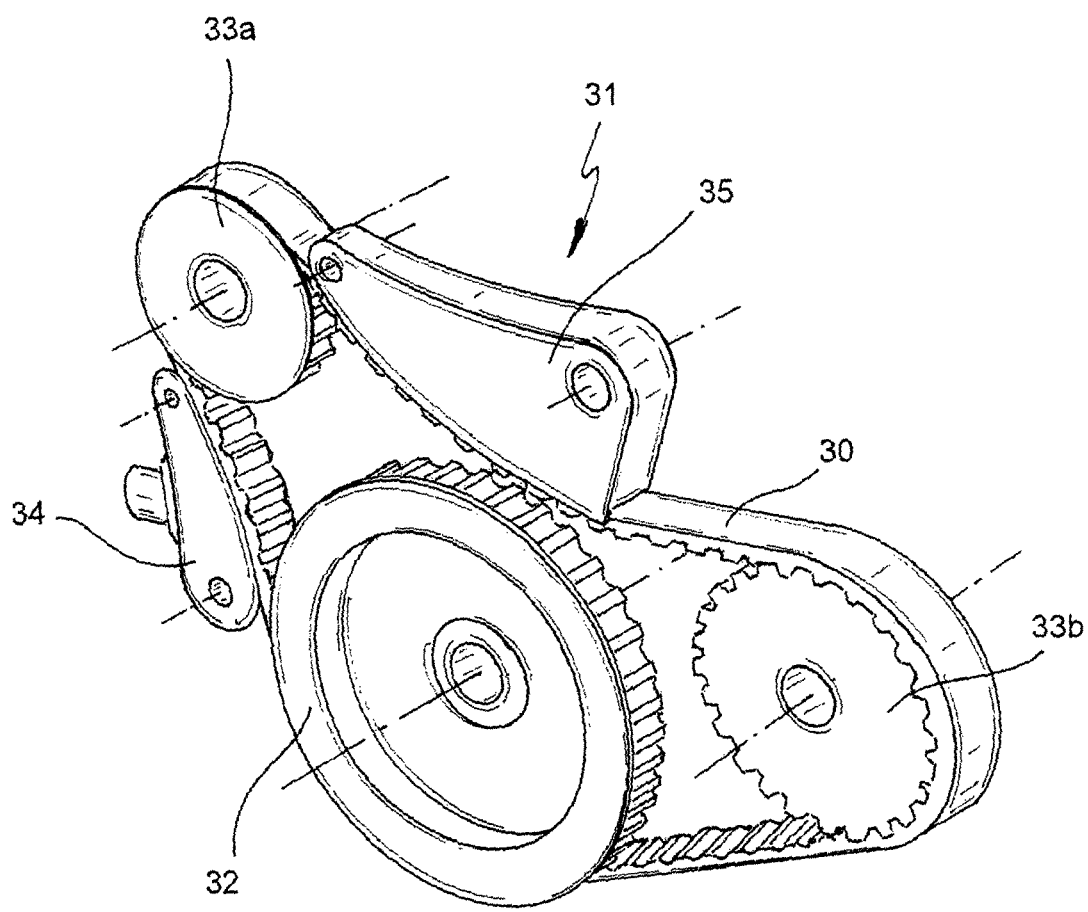
FIG. 4 is a diagram of a third timing control system using a third toothed belt according to the present invention.

According to a third embodiment of the present invention, shown in FIG. 4, a toothed belt 30 according to the present invention can be advantageously used in a timing control system, indicated in the figure as a whole by reference numeral 31, which comprises a drive pulley 32 rigidly fastened to the drive shaft, not shown, a first 33a and a second 33b driven pulley, a shoe tensioner 34 and a shoe 35.

In particular the transmission belt of the present invention has proved to be particularly effective when used in a transmission system commonly known as balance shaft system.

In use, the toothed belts 1, 20 and 30 in the respective control systems 11, 21 and 31 are in direct contact with the oil and inside the engine crankcase.

FIGS. 2 to 4 refer to control systems associated with controlling the movement of balance countershafts, but it is evident that the belt according to the present invention can also be used in so-called "cam to cam" systems or for driving the oil pump. In these cases, the belt is partially immersed in un oil bath during operation.

In addition, it is also possible to use the belt of the present invention in the main transmission for controlling the movement of the cams and also for driving the injection pump in diesel engines.

Alternatively, the belt according to the present invention can also be used as a dry belt for engine timing.

It has been experimentally established that use of the fabric according to the present invention enables achieving effective oil resistance at high temperatures as well and therefore enables passing the life tests to which toothed belts are subjected in order to be used in motor vehicles, thereby preventing all the problems of belts when used continuously in contact with oil and, in particular, the drop in mechanical characteristics; less adhesion, worse meshing and less wear resistance.

Furthermore, the belt of the present invention can be used as a dry belt in timing systems at high temperatures in excess of 130° C.

From examination of the characteristics of the belt produced according to the present invention, the advantages that can be achieved with it are evident.

Advantageously, the above-described belts can consequently be used for both dry and in-oil applications at high temperatures, even in the presence of contaminants, for example green fuels, which are particularly aggressive.

While some embodiments have been described for the purpose of illustrating the invention, it is evident that an expert in the field could make changes to the type of fibre and to the materials of which it is formed, as well as to the materials of the body mixture and the other components of the toothed belt without leaving the scope of the present invention. The fabric and the belt according to the present invention will also be described hereinafter by examples, without the invention being limited thereto.

EXAMPLES

Example 1

Warp yarns made with fibres entirely of poly-meta-aramid and, in particular, a spun yarn of Conex with a 40/2 configuration, where 40 are the metric units, or rather the number of 1000-meter hanks to make one Kg, and 2 is the number of spun yarns inside the yarn used as the warp yarn (in dtex, it is equivalent to 500 dtex).

According to the invention, warp yarns of different materials were tested to measure their tensile strength in oil and biodiesel 90:10 at 150° C. for 28 days.

The fuels used for testing were oil (5W30 Mobil 1-5W-30 ESP Formula) and biodiesel (rape-seed methyl ester).

The tests were carried out in sealed tubes of approximately 200 ml containing the oil and contaminants with a ratio between oil and fibre of 150:5. The tubes were placed in an oven for 28 days. At the end of the test, the oil was removed and the samples washed with petroleum spirit, also known as mineral turpentine, at 40-60° C., and dried before measuring the tensile strength.

The results obtained with the Conex yarns were compared with those obtained with yarns in polyamide 6.6, PPS and PEEK, all used for producing transmission belt covering fabrics.

The results of the comparative tests are shown in FIG. 5.

As can be observed in FIG. 5, the Conex yarn, i.e. the poly-meta-aramid yarn, exhibits a much higher level of tensile strength preservation, not only than that measured for polyamide 6.6, but also that for other normally-used yarns, and has therefore been shown to be particularly effective when used as the warp of fabrics for toothed belts.

Example 2

Table 2 shows an example of a fabric utilizable in transmission belts according to the invention that enables achieving excellent results in terms of resistance to wear and chemical agents when the belt, in use, is continuously in direct contact with oil of at least partially in an oil bath inside the engine crankcase.

The fabric has a 2×2 twill configuration and a structure constituted by a weft and warp having the characteristics shown in Table 2.

TABLE 2

| Parameter | Value |
|---|---|
| Pretreatment fabric weight (grams/m²) | 460 |
| Fabric weight after first and second treatment | 550 |
| Pretreatment gauge (mm) | 1.09 |
| Gauge (mm) after first and second treatment | 1.1 |
| Weft extension @ 100N (%) | 100 |
| Warp yarn material | Conex 40/2 - 500 dtex |
| Weft yarn material | 1 Elastan yarn on which 2 spun Technora yarns are wound - 1 in direction S and 1 in direction Z |
| Single Technora yarn count (dtex) | 220 |
| Elastan yarn count (dtex) | 400 |
| Elongation of pretreatment warp at breaking point (%) | 30 |
| Elongation of pretreatment weft at breaking point (%) | 150 |
| Tensile strength of pretreatment weft (N/25 mm) | 1100 |
| Tensile strength of pretreatment warp (N/25 mm) | 1000 |
| Number of weft yarns (25 mm) | 55 |
| Number of warp yarns (25 mm) | 60 |

Table 3, instead, shows an example of a fabric according to the known art. This fabric also has a 2×2 twill configuration.

The warp yarns are formed by yarns of polyamide 66 HT of the type tested in Example 1. The weft yarns that extend in the longitudinal direction of the belts, therefore in the direction in which the belt moves in use, are yarns formed by a core of polyurethane, in particular Elastan, around which a pair of composite yarns is wound. Each composite yarn is composed of a yarn of high mechanical and thermal resistance, in particular a Technora poly-para-aramid, around which a covering yarn is wound, in particular a textured polyamide 6.

The constructional details of the fabric are shown in Table 3.

TABLE 3

| Composition of yarns that extend in the longitudinal or weft direction | |
|---|---|
| Type of material | Elastan |
| Yarn count dtex, where 1 tex = 1 gr/km of thread | 480 |
| Number of threads (no. per 2.54 cm) | 55 |
| High resistance yarns | Technora |
| Yarn count (dtex) | 220 |

TABLE 3-continued

| Covering capacity (number of turns) | 900 |
|---|---|
| Covering yarns | Textured Nylon 6 |
| Composition of yarns that extend in the latitudinal or warp direction | |
| Type of material | Nylon 66 HT |
| Yarn count (dtex) | 110 |
| Covering capacity (number of turns) | 1300 |

The tests carried out are indicative of a general behaviour of the fabrics, as the remaining elements of the belt are absolutely identical to each other and could therefore be different.

In the case of the present example, the belts are used continuously in contact with oil or in an oil bath. The belts are produced in accordance with international patent application WO2005080820.

For the following tests, belts on the market with part number 03L115264A were used with only one component being different: the fabric.

In particular, to perform the swelling or bulge test on the belt in oil, tests were carried out on a transmission system, specified in Table 4. The pitch of the belts tested in this and in the subsequent tests is that universally used in the automotive field, namely 9.525 mm.

TABLE 4

| Number of belt teeth | | 59 |
|---|---|---|
| Pitch | [mm] | 7.43 |
| Width | [mm] | 10 |
| Number of drive pulley teeth | | 22 |
| Number of driven pulley teeth | | 33 |
| Temperature | [° C.] | 120 |
| Mixture composition | [%] | 80/10/10 Oil/RME/Diesel fuel |

The system by which the test is carried out is to bring the electrically driven engine from 2500 to 4500 revolutions in 90 seconds, then 4500 revolutions for 10 seconds, then from 4500 to 2500 revolutions in 90 seconds, then 2500 revolutions for 10 seconds and then repeat the same cycle.

The oil used is AGIP 70045W40 oil. The RME is a known biodiesel.

Figure 6:
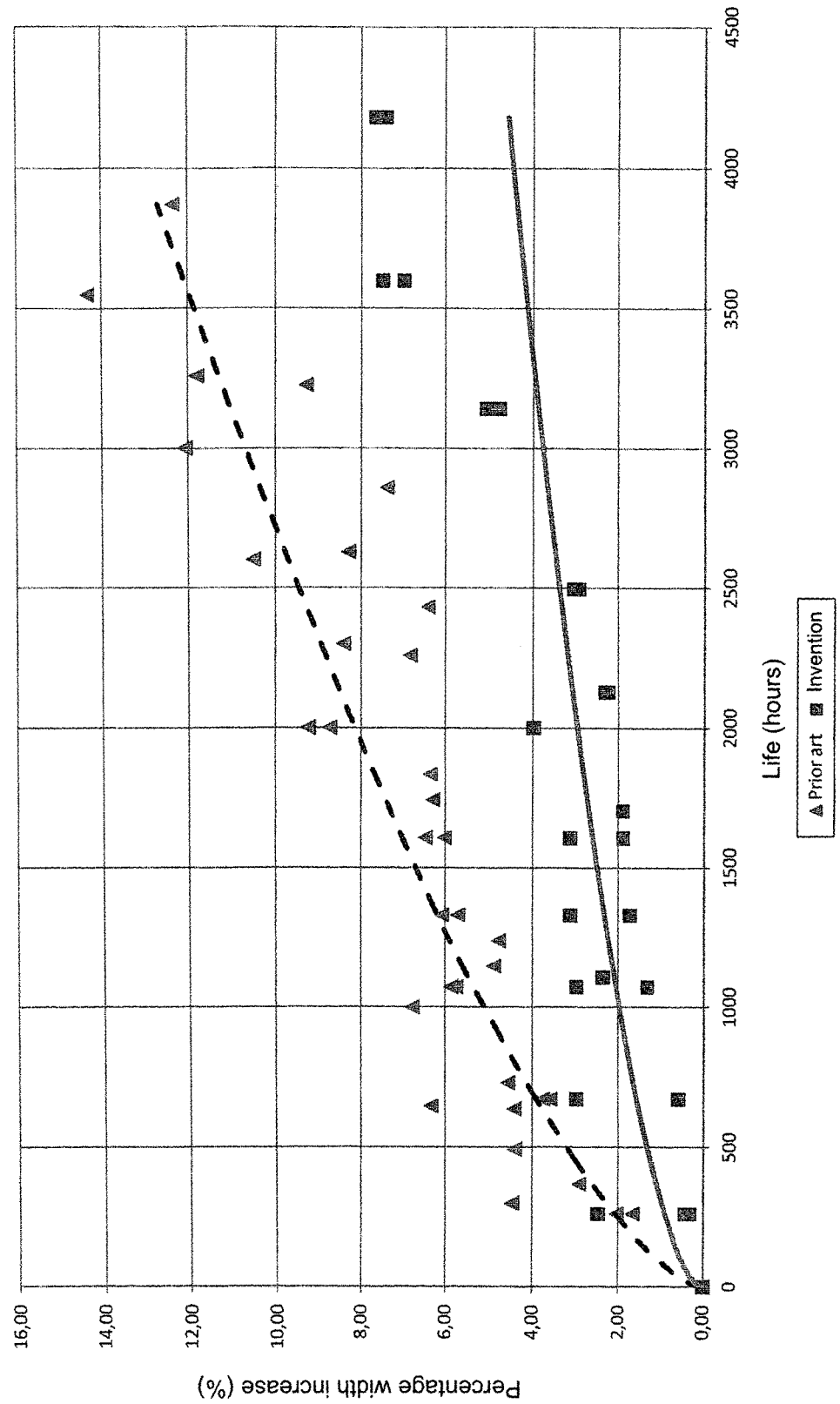
FIG. 6 is graph showing the results of a swelling test in oil/RME/diesel of the belt of the present invention compared with a belt according to the known art.

From the swelling tests shown in FIG. 6, it is evident that the belt according to the invention has much smaller swelling values in oil with respect to the belt produced according to the known art.

Example 4

Life tests have also been carried out on the belt in oil at high temperatures (90° C. and 120° C.)

Belts identical to those previously described in Tables 2 and 3 in Example 3 were tested.

The test for checking teeth breakage is again carried out using a transmission system.

TABLE 5

| Number of teeth | | 125 |
|---|---|---|
| Pitch | [mm] | 8 |
| Width | [mm] | 19 |
| Number of drive pulley teeth | | 15 |
| Number of CAM pulley teeth | | 30 |
| Rail pressure | [bar] | 1600 |

The system by which the test is carried out is to bring the testing speed [rpm] from 3000 to 5000 revolutions in 120 seconds and then from 5000 to 3000 revolutions in 120 seconds.

Figure 7:
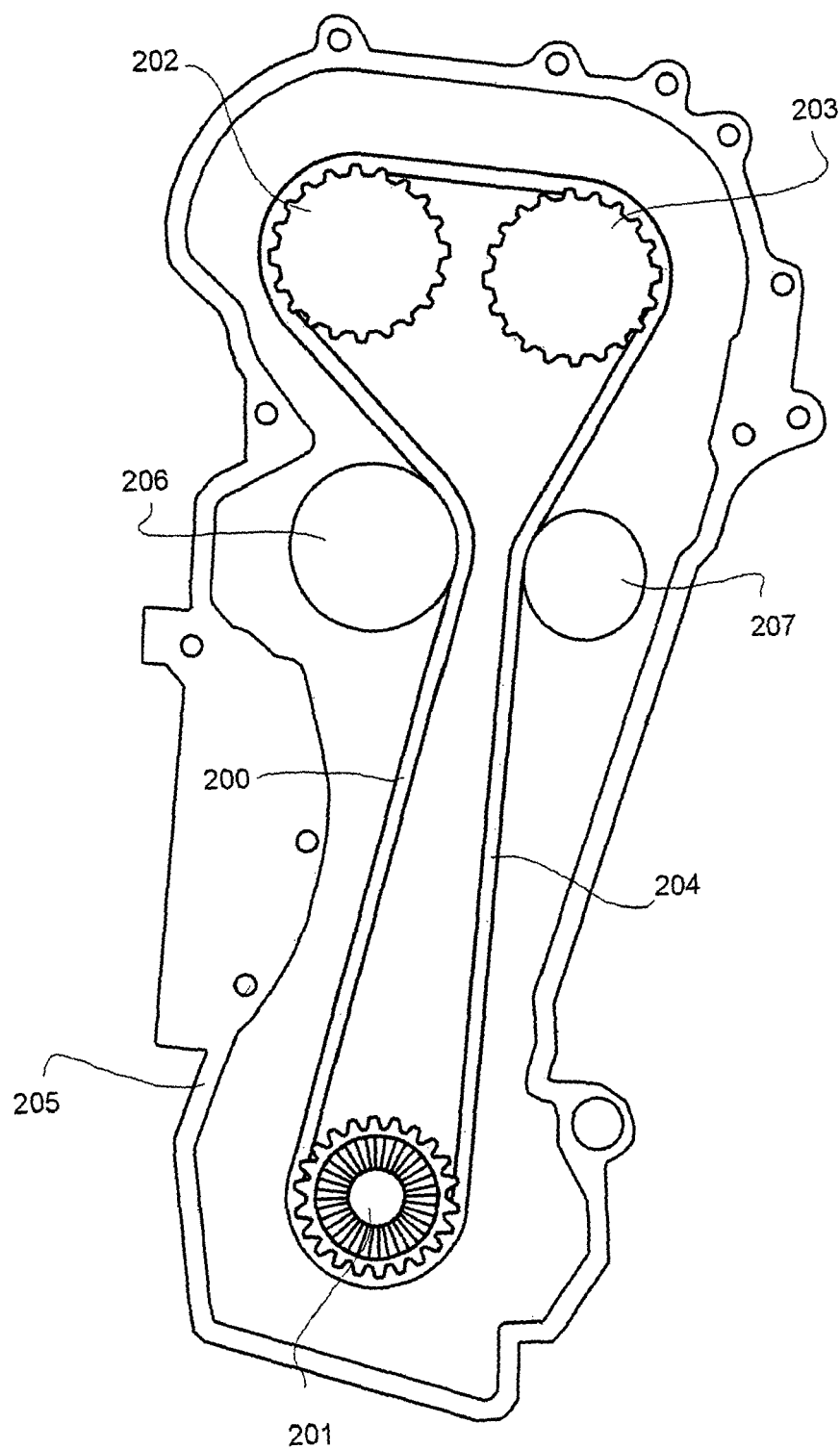
FIG. 7 shows a transmission system used for life tests on toothed belts according to the invention and according to the known art.

The transmission system used is shown in FIG. 7, where it is indicated by reference numeral 200, and comprises a drive pulley 201, two cams 202 and 203, and a toothed belt 204. The injection pump is on the opposite side of cam 203. The transmission system is arranged inside a crankcase 205 and also comprises an automatic tensioner 206 and an idler 207.

The results of the test are shown in Table 6.

TABLE 6

| Oil temperature (° C.) | Belts according to prior art (hours) | Belts according to the invention (hours) |
|---|---|---|
| 90 | 777 | 995 |
|  | 584 | 1196 |
|  | 793 |  |
| 140 | 233 | 794 |
|  | 243 |  |

As can be seen from Table 6, the higher the temperature of the oil, the higher is the difference in the number of hours of life of the belt according to the invention with respect to that according to the prior art.

Therefore, independently of the test used or the transmission system or the various components that constitute the belt, the belt according to the invention has delayed tooth breakage.

The invention claimed is:

1. A belt for continuous contact with oil or immersion in an oil bath, said belt comprising;
   a body made of a first elastomeric material,
   a toothing,
   a plurality of resistant longitudinal inserts embedded in the body of the belt, and
   a back,
   wherein said belt has a working surface and said working surface is covered with a covering fabric comprising weft and warp yarns, characterised in that said weft yarns comprise polyaramid, and said warp yarns consist of poly-meta-aramid.

2. The belt according to claim 1, characterised in that said weft yarns are formed by an elastic yarn and by a first and second yarn.

3. The belt according to claim 2, characterised in that said weft yarns are formed by poly-para-aramid.

4. The belt according to claim 3, characterised in that said first yarn is a poly-para-aramid fibre yarn wound around said elastic yarn in a first direction and said second yarn is a poly-para-aramid fibre yarn wound in an opposite direction around said first yarn.

5. The belt according to claim 1, characterised in that said transmission belt is a toothed belt.

6. The belt according to claim 1, characterised in that said back is covered with said covering fabric.

7. The belt according to claim 1, characterised in that said first elastomeric material is obtained from a diene monomer and a nitrile-group containing monomer.

8. The belt according to claim 7, characterised in that said nitrile groups are in a percentage in the range between 33 and 51 percent by weight.

9. The belt according to claim 7, characterised in that said first elastomeric material is selected from the group consisting of NBR, HNBR, XHNBR or mixtures thereof.

10. The belt according to claim 9, characterised in that said first elastomeric material comprises a polymer containing an unsaturated carboxylic acid and/or a salt of an unsaturated carboxylic acid.

11. The belt according to claim 1, characterised in that said fabric is subjected to a first treatment and to a second treatment.

12. The belt according to claim 11, characterised in that said first treatment comprises polyisocyanates.

13. The belt according to claim 12, characterised by comprising a third treatment.

14. The belt according to claim 13, characterised in that said third treatment comprises an elastomer selected from the group consisting of NBR, HNBR, XHNBR or mixtures thereof.

15. The belt according to claim 13, characterised by comprising a fourth treatment.

16. The belt according to claim 11, characterised in that said second treatment comprises an adhesive.

17. A timing control system for a motor vehicle comprising at least one drive pulley, a driven pulley and means adapted to continuously maintain a belt according to claim 1 in contact with oil or immersed in oil.

* * * * *